United States Patent [19]

Sugiura et al.

[11] 4,313,658

[45] Feb. 2, 1982

[54] CAMERA HAVING ELECTROMAGNETIC DRIVE SOURCE

[75] Inventors: Yoji Sugiura, Yokohama; Nobuaki Date, Kawasaki; Ryoichi Suzuki, Kawasaki; Syuichiro Saito, Kawasaki, all of Japan

[73] Assignee: Canon Kabushiki Kaisha, Tokyo, Japan

[21] Appl. No.: 132,100

[22] Filed: Mar. 20, 1980

[30] Foreign Application Priority Data

Mar. 26, 1979 [JP] Japan .................. 54-35312
Oct. 1, 1979 [JP] Japan .................. 54-127194
Oct. 15, 1979 [JP] Japan .................. 54-132565
Feb. 25, 1980 [JP] Japan .................. 55-22510

[51] Int. Cl.³ .................. G03B 9/08; G03B 19/12
[52] U.S. Cl. .................. 354/152; 354/234; 354/246; 354/268

[58] Field of Search .................. 354/234, 50, 133, 136, 354/152, 242, 246, 268, 267, 266

[56] References Cited

U.S. PATENT DOCUMENTS 4,096,503  6/1978  Sato .................. 354/268
4,202,617  5/1980  Urano .................. 354/268

*Primary Examiner*—Joseph W. Hartary
*Assistant Examiner*—S. D. Schreyer
*Attorney, Agent, or Firm*—Toren, McGeady & Stanger

[57] ABSTRACT

Disclosed is a single lens reflex camera having an electrically driven focal plane shutter. A locking arrangement locks the shutter curtains in their start positions before shutter release to prevent unintentional actuation of an exposure due to faulty operation of switches, shock, or the like. Upon completion of the upward movement of the quick return mirror, the locking mechanism is disabled.

13 Claims, 12 Drawing Figures

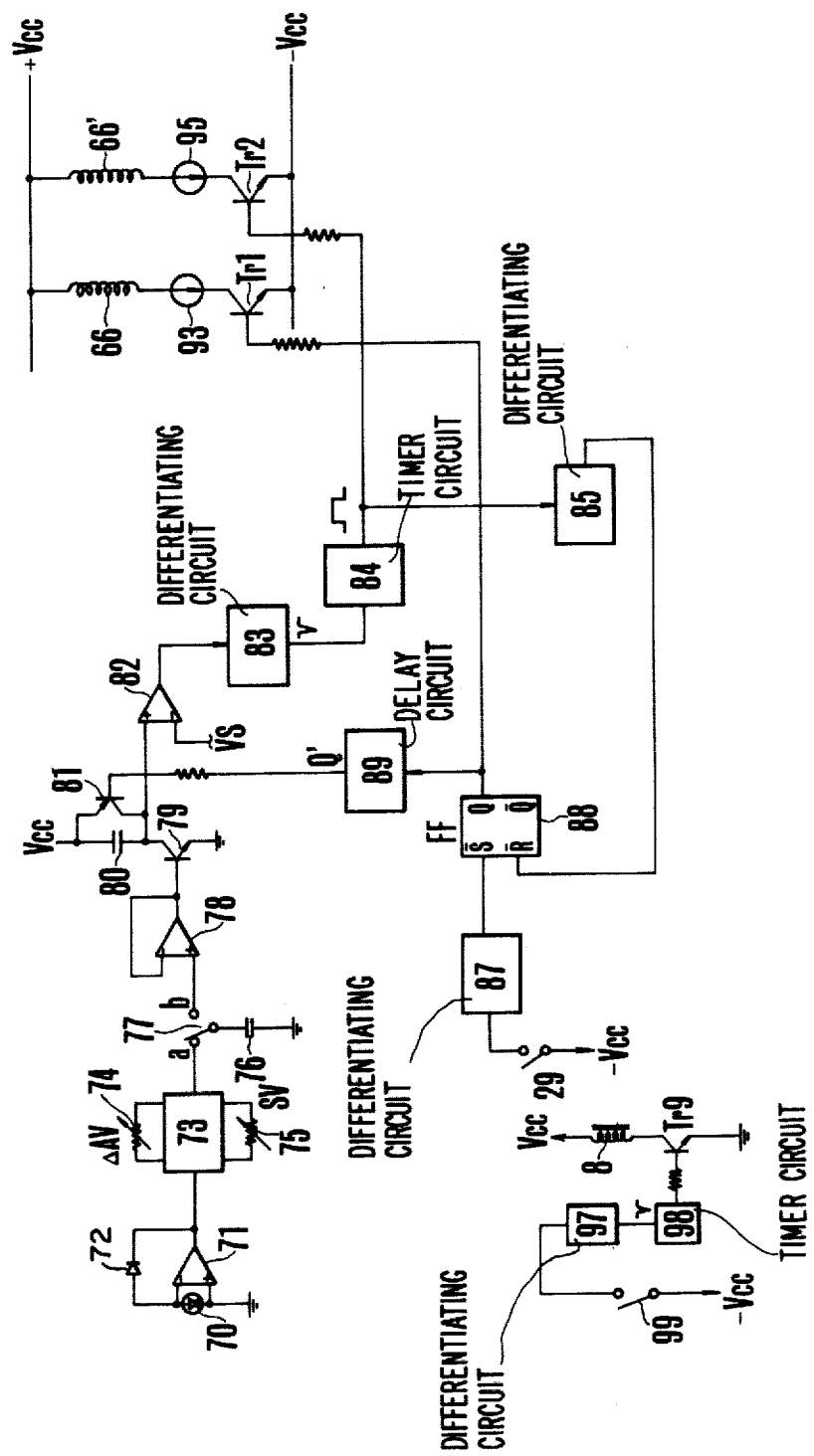
F I G. 3

CAMERA HAVING ELECTROMAGNETIC DRIVE SOURCE

DESCRIPTION OF THE PRIOR ART

In the past, as the drive source for running down the curtains of the camera shutter general use has been made of a spring. Recently, on the other hand, as the electronization of camera advances, the trend to electrically control exposure adjustment, photographic sequence and the like becomes prominent. From this standpoint, since even in the highly electronized cameras the shutter drive system is constructed in the mechanical form, the entire structure of the camera appears to be as complicated as ever. Recently, in order to eliminate such complexity of structure it is proposed to electromagnetically drive the shutter.

It is obvious that where an electromagnetic drive source is incorporated in the camera so that the shutter is driven by the electromagnetic force, there is no need to provide the various kinds of mechanical moving parts as in the conventional cameras, and therefore that the structure of camera becomes extremely simple.

On the other hand, for the accommodation of an electrical energy source within the interior of the camera housing, the availability of limited space makes it difficult to use a battery of much desired large capacity and of large size. Therefore, it is required to construct as light shutter curtains and drive means therefor as possible along with their moving parts of reduced friction so that a small size electromagnetic drive source which consumes less electrical power may be selected for use therewith. The fulfilment of this requirement will, however, give rise to a problem that when the camera with the shutter curtains in the start position ready to run down for making an exposure receives a shock, the shutter curtain or curtains is or are caused to accidentally move to effect an unintentional exposure of the film, or a power supply control switch for the electromagnetic drive source is subjected to faulty operation with the result that the shutter curtain runs down.

It is also known that as the running movement of the shutter curtain is completed, when it strikes a mechanical stopping member, the shutter curtain tends to bounce therefrom, thereby the film gate is blocked in a portion of the area of the opening, or opened again to effect an incorrect exposure of the film. In the conventional focal plane shutter, such bound of the shutter curtain is prevented by the use of a frictional brake, or a latching pawl for protecting the repulsion. However, such conventional bound preventing device not only requires fine adjustment in assembly, but also necessitates control means for taking off the latching pawl. This calls for an increase in the complexity of structure, and is proven to be unsuitable for use with the electromagnetically driven shutter.

SUMMARY OF THE INVENTION

A first object of the present invention is to provide a single lens reflex camera having an electromagnetically operated focal plane shutter provided with locking means for preventing the shutter curtains from being accidentally actuated by the faulty operation of the power supply control switch, shock or the like when in the start positions before running down.

A second object of the present invention is to provide an arrangement of the above described locking means in which an actuation of release is effected in response to the flipping up movement of the quick return mirror of the single lens reflex camera, so that even when the electromagnetic drive source is supplied with electrical power by the faulty operation of the control switch, the shutter is prevented from taking an unintentional exposure.

Another object of the present invention is to employ electromagnetic means in controlling the operation of the locking means to lock and release the shutter curtains.

Still another object of the present invention is to provide such camera in which the prevention of bound of the shutter curtains is effected by utilizing the electromagnetic drive source.

These and other objects and features of the present invention will become apparent from the following detailed description of embodiments thereof taken in conjunction with the accompanying drawings in which:

BRIEF DESCRIPTION OF THE DRAWINGS

FIG. 3 is an electrical circuit diagram, partly in block form, of a control circuit for controlling the shutter of FIG. 1.

DETAILED DESCRIPTION OF THE PREFERRED EMBODIMENTS

Figure 1:
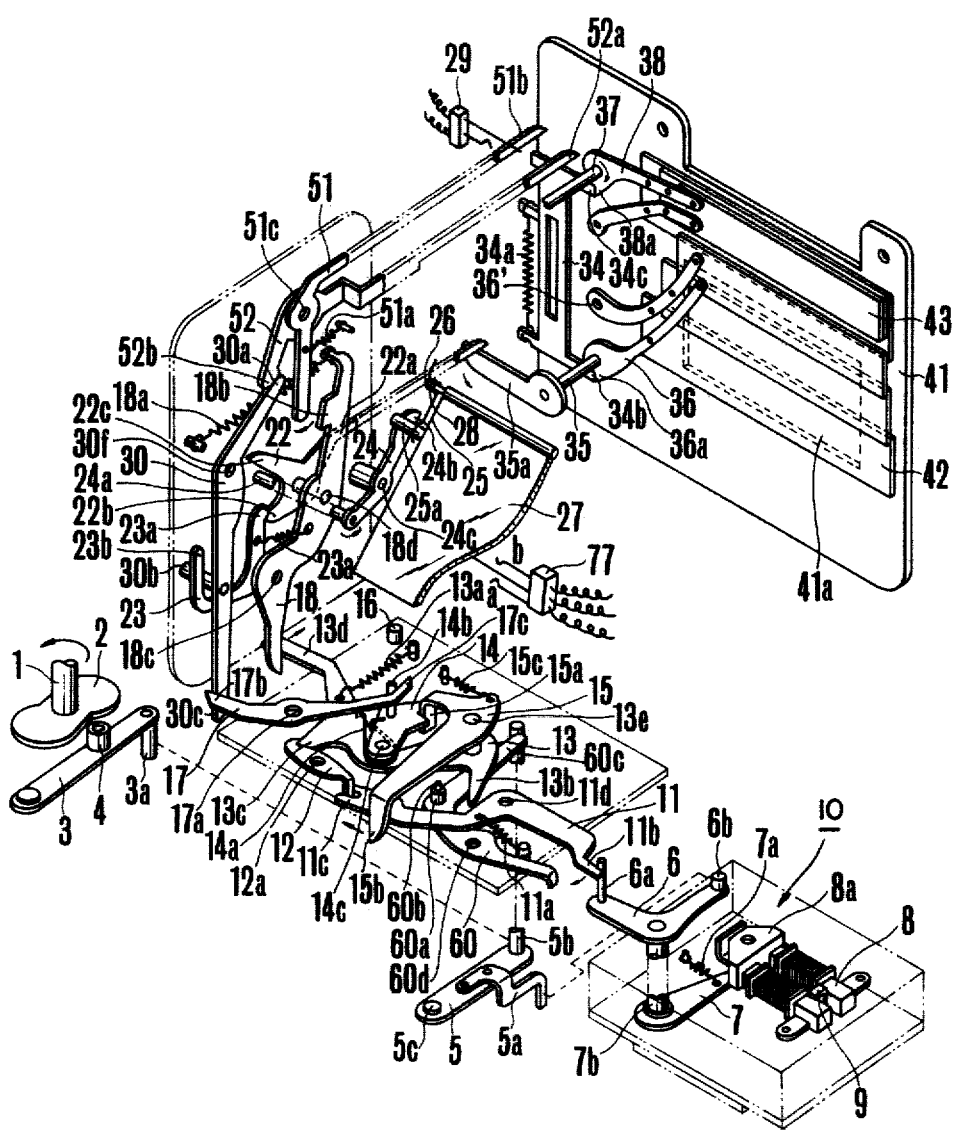
FIG. 1 is an exploded perspective view of a first embodiment of a shutter according to the present invention.

In FIG. 1, 1 is a wind shaft rotating in unison with a winding lever (not shown) of the camera and having a cam 2 fixed to the bottom end thereof. 3 is a lever pivoted to be rotatable about a shaft 3b and fixedly carrying a cam follower 4 engaging on said cam 2 and a pin 3a. 5 is an interlinking lever for charging a diaphragm and mirror drive mechanism pivoted to be rotatable about a shaft 5b and cooperating with said pin 3a through an intermediary (not shown). A pin 5b fixedly mounted on the end of the lever 5 engages one arm of a charge lever 60 to be described later. 10 indicates a release of the camera including an electromagnet 8 with a permanent magnet 9. 8a is an armature for attraction to the electromagnet 8 borne on a support lever 7. 6 is a release signal lever affixed to a common shaft 7b of the support lever 7 so that they can rotate in unison with each other. 7a is a spring urging the armature 8a to be moved away from the electromagnet 8; 6b is a pin fixedly mounted on the lever 6 and engaging with a leaf spring 5a fixedly mounted on the above described interlinking lever 5; and 6a is a pin fixedly mounted on the lever 6 and engaging one arm 11b of a release lever 11.

The release lever 11 is pivoted to be rotatable about a shaft 11d, and the opposite end 11c is formed to a double finger configuration, engaging the tail end of a latching lever 12 which is rotatable about a shaft 12a. 13 is a drive lever pivoted to be rotatable about a shaft 13e and when turned in a counterclockwise direction to charge a diaphragm drive spring 13a. One end 13c of said lever 13 is arranged upon engagement with a hooked end portion of the above described latching lever 12 to be latched in the charged state.

15 is a diaphragm drive lever pivoted to be rotatable about the shaft 13e, and the bent portion 15b of its one arm engages with an automatic aperture control pin of a photographic objective lens (not shown). At the center of one arm of the lever 13 is fixedly mounted a pin 14c about which a cooperation lever 14 is supported to be rotatable, and a spring 14a urges to turn in a clockwise direction to engage the diaphragm drive lever 15 at the opposite end 15a thereof. 15c is a spring urging the diaphragm drive lever 15 in a direction to engage with the cooperation lever 14. 60 is a charge lever pivoted to be rotatable about a shaft 60d, and its one arm 60c engages with a pin 5b of the interlinking lever 5, while the free end 60b of a pin 60a fixedly mounted on said arm at the center thereof engages with the above described drive lever at an arm 13b thereof to transmit clockwise rotation of the lever 5 to the drive lever 13 to charge the spring 13a. The above described release lever 11 is urged in a counterclockwise direction by a weaker spring 11a than the spring 7a, and one arm 11b always engages with the pin 6a of the signal lever.

17 is an automatic aperture signal lever pivoted to be rotatable about a shaft 17a and having one arm 17c engaging with a pin 14b on the cooperation lever 14, and another arm 17b engaging with a mirror return signal lever 30 at the bottom end thereof. 16 is a stopper limiting a range of movement of the drive lever 13.

18 is a mirror drive lever rotatable about a stationary shaft 18d and engaging at its bottom end with one arm 13d of the drive lever 13, the top end of which has a bent portion for connection of a mirror drive spring 18a. On the lower arm of said lever 18 is fixedly mounted a shaft 18c about which a latching lever 23 is pivoted to be rotatable. The lever 23 is urged by a spring 23a in a clockwise direction, and has a hook 23a formed in the free end thereof and arranged to engage with a pawl portion 22b of a mirror flip-up lever 22 which is rotatable about the above described shaft 18d.

24 is an intermediate lever rotatable about a shaft 24c and having one end 24b engaging a pin 25a of a mirror receptor plate 25 and a pin 24a fixedly mounted on the opposite arm thereof and engaging with an arm 22c of the flip-up lever 22. 26 is a rotary shaft and 27 is a quick return mirror.

One arm of the drive lever 18 is provided with a projected portion 18b arranged to engage with a lower free end portion of a switch actuating lever 51. Said actuating lever 51 is pivoted to be rotatable about a shaft 51c, is urged by a spring 51a in a counterclockwise direction, and has the opposite arm 51b arranged upon contact with one of the elements of a normally opened type mirror up completion signal switch 29 to close said switch. Further, the arm 51b is engageable at its lower surface with the upper end of a shutter curtain lock plate 34 to be described later.

Also pivoted at the shaft 51c is a rear curtain signal lever 52 with its one arm 52a engaging with a rear curtain drive arm to be described later, and with its opposite arm 52b engaging one end 30a of the mirror return signal lever 30.

Said signal lever 30 is pivoted at a shaft 30f, and a pin 30b fixedly mounted on one arm thereof engages with the opposite arm 23b of the latching lever 23. 41 is a shutter base plate provided with an exposure aperture 41a, and 42 and 43 are shutter front and rear curtains respectively.

Figure 2:
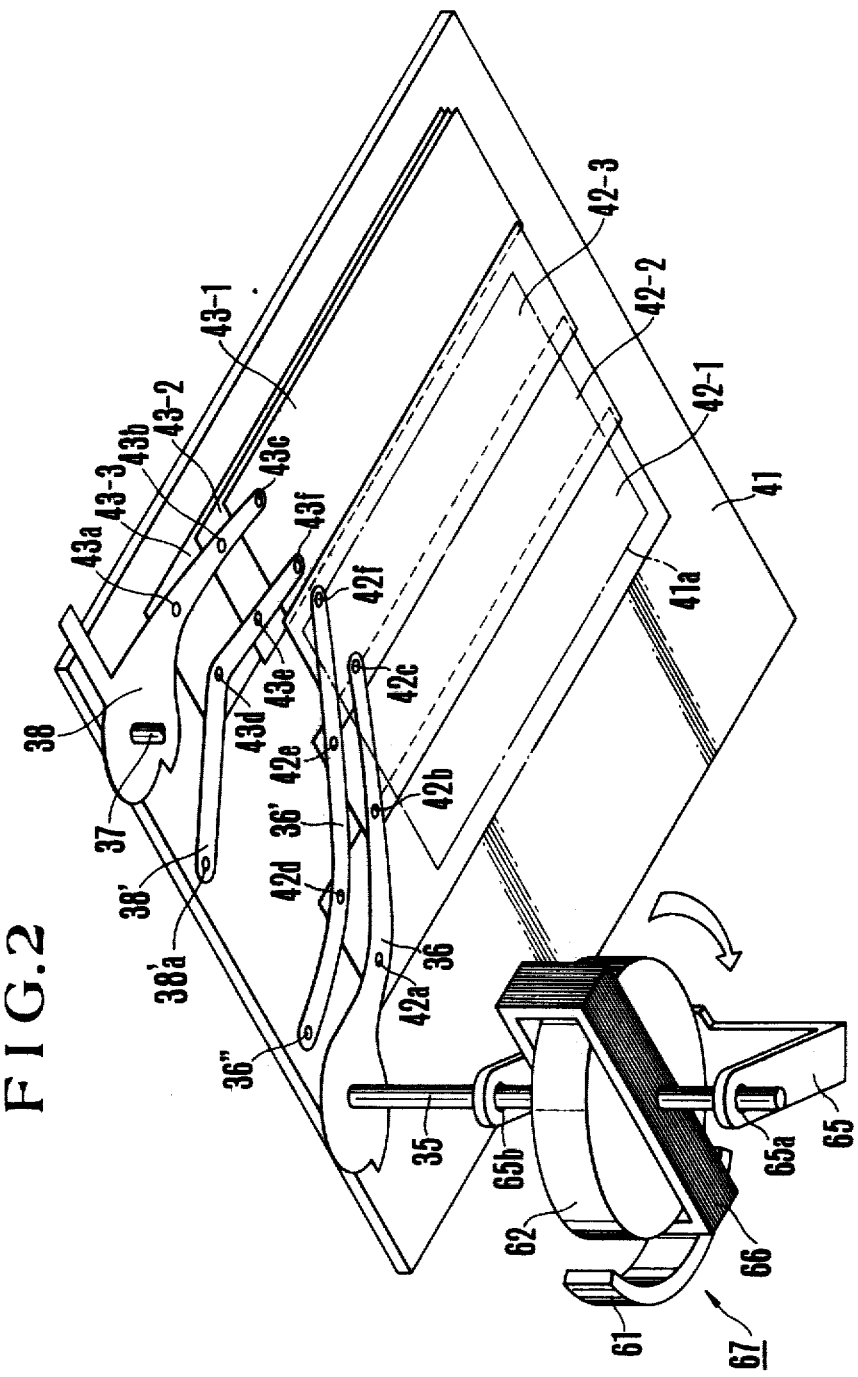
FIG. 2 is a perspective view showing the details of the shutter and an electromagnetic drive source.

As shown in detail in FIG. 2, the front curtain 42 consists of three opaque thin blades 42-1, 42-2 and 42-3 connected ring-wise by two drive arms 36 and 36' and pins 42a-42f and arranged to move along the base plate 41 so that the above described apertured portion 41a is opened and closed. The arm 36' is pivoted at a shaft 36" on the base plate 41, and the arm 36 is fixedly mounted on a drive shaft 35 of an electromagnetic drive source 67 for the front curtain, and supported on the base plate 41 so as to rotatable along with said shaft.

The rear curtain 43 consists of three thin blades 43-1, 43-2 and 43-3 similar to those of the front curtain, connected linkwise to drive arms 38 and 38' by pins 43a-43f, and arranged to open and close the apertured portion in a similar manner to that in which the front curtain operates.

The arm 38' is pivoted at a shaft 38a on the base plate 41, and the arm 38 is fixedly mounted on a drive shaft 37 of an electromagnetic drive source (not shown) for the rear curtain and is pivoted so as to rotate along with said shaft.

The electromagnetic drive source 67 has a frame 65, a permanent magnet 62 fixedly mounted at a portion thereof to said frame, and a coil 66 rotatable about said magnet, and the drive shaft 35 affixed to the coil 66 is rotatably supported in fitted holes 65a and 65b provided in the frame 65. 61 is a yoke provided around the coil 66 and fixedly mounted on the frame 65. Though only the electromagnetic drive source for the front curtain is shown in FIG. 2, the electromagnetic drive source for the rear curtain is of similar construction. Every electromagnetic drive source when supplied with current to its coil rotates the respective shaft 35, 37 in a predetermined range within 180°, thus driving the arms 36 and 38 to move the front and rear curtains of the shutter to the run down positions.

Turning to FIG. 1, at the free end of the front curtain drive shaft 35 is fixedly mounted an arm 35a for shutter resetting extending to engage with one arm 22a of the above described mirror flip-up lever 22.

34 is a shutter lock plate slidably mounted on the base plate 41 and urged by a spring 34a to move upwards as viewed in the figure. 34b is a projection for engagement with a pawl portion 36a of the front curtain drive arm 36, and 34c is a projection for engagement with a pawl portion 38a of the rear curtain drive arm 38. As shown in the figure, when the shutter is reset to the start position ready for running down, the front curtain of the shutter covers the exposure aperture 41a, while the rear curtain of the shutter is retracted from the aperture. At this time, the rear curtain is restrained from further moving upward by a stopping member (not shown), and the front curtain abuts with the uppermost blade 42-3 against the blade 43-1 of the rear curtain through a hump (not shown) and is restrained from further moving upward. Besides this, as the lock plate engages with the drive arms, every shutter curtain 42, 43 is stopped from moving downward from the positions shown in the figure. Thus, such locking assures that erroneous actuation is not caused to occur even by shock or accidental current supply to the coil.

FIG. 3 is an electrical circuit diagram showing one embodiment of a control circuit for controlling the operation of the shutter mechanism shown in FIGS. 1 and 2. In the figure, 70 is a photovoltaic element (SPC); 71 is an operational amplifier (hereinafter abbreviated to OP amplifier) constituting an SPC head amplifier with the above-described SPC 70 connected between the two inputs thereof, and a diode 72 for logarithmic compression connected in the feedback network. 73 is a computer circuit known in the art; 74 is a variable resistor for setting preset aperture stop number information ($\Delta Av$); 75 is a variable resistor for setting ASA sensitivity information (Sv) of the used film; and the above-described computer circuit 73 produces an output representing shutter time information (Tv) which is to be controlled. 76 is a condenser for storing said Tv information; 77 is a changeover switch normally connected to an "a" contact and changed over to a "b" contact in response to upward movement of the quick return mirror. 78 is an OP amplifier constituting a voltage follower; 79 is a transistor for logarithmic elongation with its collector connected to a timing condenser 80. 81 is a switching transistor for count start; 82 is an OP amplifier constituting a comparator circuit with its non-inversion input connected to the collector terminal of the transistor 79 for elongation and with its inversion input supplied with a reference voltage Vs. 83 is a differentiation circuit connected to the output of the comparator circuit 82, 84 is a timer circuit triggered by the negative differentiation pulse of the differentiation circuit 83 to produce an output of high level for a predetermined time (for example, 20mS). 85 is a differentiation circuit having an input connected to the output of the timer circuit 84.

29 is a normally open switch arranged to be closed when the upward movement of the quick return mirror has been completed. The closure of said switch causes the next stage differential circuit 87 to produce a negative differentiation pulse. 88 is an RS flip-flop circuit with its set input connected to the output of the differentiation circuit 87 and with its Q output terminal connected to a delay circuit 89. Again, said delay circuit 89 has an output Q' connected to the base of the count start switching transistor 81 through a resistor.

Tr1 and Tr2 are respectively connected at their bases to the Q output terminal of the flip-flop circuit 88 and the output of the timer circuit 84 and the collector of the transistor Tr1 is connected to a constant current source 93 which is connected to the coil 66 constituting part of the front shutter curtain drive source. Also the collector of the transistor Tr2 is connected to a constant current source 95 which is connected to the coil 66' constituting part of the rear shutter curtain drive source. 99 is a release switch cooperative with a shutter button (not shown), 97 is a differentiation circuit; 98 is a timer circuit responsive to the output pulse of the differentiation circuit for producing an output representing a predetermined time; Tr9 is a transistor connected to the output terminal of the timer circuit; 8 is the magnet of FIG. 1.

Next explanation is given to the operation of the embodiment shown in FIGS. 1, 2 and 3. All the mechanisms shown in the figures are assumed to be in a position where the shutter is reset with its front and rear curtains being made ready for running down.

In this state, when the release button (not shown) is pushed, the switch 99 of FIG. 3 is turned on. The action of the differentiation circuit 97 causes the timer circuit to be triggered with production of a high level signal for a predetermined time. Therefore, the transistor Tr9 is turned on to supply the electromagnet 8 with electrical energy. For this reason, the attractive force of the permanent magnet 9 of FIG. 1 is cancelled, and the armature 8a is moved in the counterclockwise direction by the action of the spring 7a. Therefore, the pin 6a of the lever 6 connected in unison with the lever 7 pushes the release lever 11, and the lever 11 is turned in the clockwise direction against the force of the spring 11a. Since the latching lever 12 is turned in the counterclockwise direction by the lever 11, the engagement with the end portion 13c of the drive lever 13 is released, and the lever 13 is turned in the clockwise direction by the action of the spring 13a. Such motion of the lever 13 causes the diaphragm drive lever 15 to be turned in the clockwise direction in unison therewith through the cooperation lever 14, which in turn causes a pin (not shown) of a diaphragm drive ring in the lens mounting to be turned in a clockwise direction. Thus, diaphragm blades (not shown) are closed down to the preset aperture value. Such motion of the drive lever also causes the mirror drive lever 18 to be turned in the counterclockwise direction by the spring 18a as the drive lever 13 is moved away at its free end from the lower end portion of the mirror drive lever 18. The mirror drive lever 18 and mirror flip-up lever 22 on the same shaft rotate in the same direction in unison with the flip-up latching pawl 23, while its arm 22c pushes the pin 24a of the intermediate lever 24 so that said lever is turned in the counterclockwise direction, thereby the mirror support plate 25 is flipped up against the force of the spring 28 as turned about the shaft 26 by the opposite end 24b through the pin 25a of the mirror support plate 25.

Such upward movement of the mirror also causes the switch 77 of FIG. 1 to move from its "a" to "b" position where the shutter time information Tv is stored on the condenser of FIG. 3. In more detail, since the circuit of FIG. 3 has been rendered operative by closing a power switch (not shown) before the release button is pushed, the amplifier produces an output in the form of a voltage dependent upon the object brightness Bv and the full open F-number Avo of the objective lens, and this voltage is computed by the computer circuit 73 with the preset aperture in the number of stops to be closed down from the minimum possible aperture value or $\Delta Av$ and the film sensitivity Sv to produce an output representative of a shutter time information Tv. Therefore, this Tv information enters the condenser 76 and is stored therein.

As the lever 18 turns the mirror by 45°, when the upward movement of the mirror is completed, the mirror drive lever 18 with its projected portion 18b turns the lever 51 in the clockwise direction against the spring 51a, while the free end 51b pushes the lock plate 34 downwards against the force of the spring 34a, thereby the projected portions 34c and 34b of the lock plate 34 are disengaged from the pawl portions 38a and 36a of the shutter curtain drive means 38 and 36 respectively. Thus, the shutter curtains are made ready for actuation. At this time, the shutter curtains are maintained stationary by suitable means such as friction, click and spring known in the art, or otherwise they would be caused to perform malfunction by their own weights. Such movement of the lever 51 also causes the switch 29 to be turned on which causes actuation of the differentiation circuit 87 of FIG. 3. Then the flip-flop circuit 88 is set to produce a high lever signal at the output stage Q thereof. Responsive to this signal, the transistor Tr1 turns on so that a current regulated by the constant current circuit 93 flows through the coil 66 to exert a force in that part of the coil winding of FIG. 2 which lies in the magnetic field. As this force serves as a couple force relative to the shaft 35, the shaft 35 is turned in the clockwise direction, while moving the front curtain drive arm 36 in the clockwise direction, thereby the front curtain of the shutter is retracted to open the exposure aperture, thus initiating an exposure. Such setting of the flip-flop circuit 88 causes the delay circuit 89 to produce a high level signal in the delay of a predetermined time, and the transistor 81 is then turned off. Therefore, charging of the condenser 80 by the collector current of the transistor 79 starts. Since the base of said transistor 79 is connected to the output terminal of the amplifier 78, the above-identified collector current corresponds to the value obtained by logarithmically elongating the Tv information stored in the condenser 76. Therefore, the condenser 80 is charged at a rate dependent upon the shutter time value determined based on the object brightness, in other words, the voltage on the condenser reaches a level equal to the reference voltage Vs during a time interval dependent upon the above-identified Tv value, and the comparator circuit 82 is inverted to trigger the differentiation circuit 83. Therefore, the differentiation circut 83 produces a differentiation pulse to trigger the timer circuit 84. In a predetermined time, the timer circuit 84 produces a high level signal by which the transistor Tr2 is turned on so that a constant current flows through the coil 66' of the rear curtain electromagnetic drive source. Therefore, the drive shaft 37 turns in the direction indicated by arrow to close the shutter curtain 43, thus terminating the exposure. It is noted that the time during which the output of the timer circuit 84 remains at high level is prescribed to a somewhat longer value than that necessary to complete the running down movement of the rear shutter curtain from the start thereof in order to insure that the shutter is closed with high reliability. Then, when the duration of the high level signal from the timer circuit 84 is terminated, that is, when the output of the timer circuit 84 changes to low level after the shutter has been closed, the differentiation circuit 85 is triggered to produce a differentiation pulse which is applied to reset the flip-flop circuit 88. Therefore, the completion of exposure control leads to turn off the transistors Tr1 and Tr2.

Meanwhile, as the shaft 37 turns in the direction indicated by arrow, when the rear curtain starts to run down, the pawl portion 38a of the arm 38 pushes the arm 52a of the lever 52, thereby the arm 52a is turned in the counterclockwise direction. Therefore, the free end 30a of the lever 30 is pushed by the lever 52, and the lever 30 turns in the clockwise direction. At this time, the lever 51 also turns in the counterclockwise direction in engagement with the stepped portion of the lever 52. Such clockwise movement of the lever 30 causes the pin 30b to turn the latching pawl 23 in the counterclockwise direction, thereby it is disengaged from the mirror flip-up lever 22. Then, the mirror support plate 25 is released from the setting in the flipped up position and returns to the viewing position under the action of the return spring 28.

At this time, the lever 24 also turns in the clockwise direction, and motion of the lever 24 is transmitted through the pin 24a and arm 22c to turn the lever 22 in the clockwise direction, thereby the resetting lever 35a is turned in the direction indicated by arrow by the arm 22a. Since at this time the electrical power supply to the electromagnetic drive sources is already cut off as has been mentioned above, such rotative movement of the lever 35a causes the arm 36 to turn in the counterclockwise direction. Thus, the front and rear curtains of the shutter are reset to the initial states. At the same time, the lock plate 34 also returns as is lifted upward by the force of the spring 34a, and locks again the shutter by the pawl portions 36a, 38a.

As has been mentioned above, when the lever 30 turns, the signal lever 17 turns in the counterclockwise direction, causing the cooperation lever 14 to be turned in the counterclockwise direction in engagement with the pin 14b, thereby the downwardly extending portion 15a of the diaphragm drive lever 15 is released from engagement therewith. Then, the lever 15 is turned in the counterclockwise direction by the spring 15a to fully open the diaphragm blades through a mechanism known in the art, thus completing a first held cycle of photographic operation.

Next explanation is given to a second held cycle of photographic operation in which the film is advanced one frame. Upon operation of the wind lever (not shown), the wind shaft 1 is turned in the direction indicated by arrow, while turning the lever 3 about the shaft 3b in the clockwise direction as the cam 2 pushes the follower 4. In response to this movement, the lever 5 turns about the shaft 5c in the clockwise direction, while pushing the charge lever 60 at one end 60c thereof in engagement with the pin 5b thereby the lever 60 is turned about the shaft 60d in the clockwise direction. At this time, the stepped portion 60b of the pin 60a on the lever 60 pushes the arm 13b of the power store lever 13, thereby said lever is turned about the shaft 13e in the counterclockwise direction to bring its one arm 13c into engagement with the latching lever 12. Such rotative movement of the lever 13 also causes the drive spring 13a to be charged, and causes the free end 14b of the cooperation lever 14 to be engaged again with the bent portion 15a of the diaphragm drive lever 15. The plate spring 5a of the lever 5 also pushes the pin 6b of the signal lever, thereby said lever 6 is turned in the clockwise direction against the spring 7a, and the armature 8a on the lever 7 is brought into contact with the electromagnet 8 and held therein by attraction to the permanent magnet 9.

The above-described rotative movement of the lever 13 also causes the mirror drive lever 18 to be turned about the shaft 18d in the clockwise direction in engagement with the lower end portion thereof, thereby the mirror drive spring 18a is charged. The latching lever 23 moves along with rotative movement of the drive lever 18 and engages again with the mirror flip-up lever 22, thus completing the preparation for the next exposure.

In the above-described embodiment, the shutter lock member is so constructed and so arranged as to be sustained in the active position by the use of the spring 34a. In another embodiment shown in FIGS. 4 and 5, however, the shutter lock member is made sustained by a magnet, and electromagnetically releasable.

Figure 4:
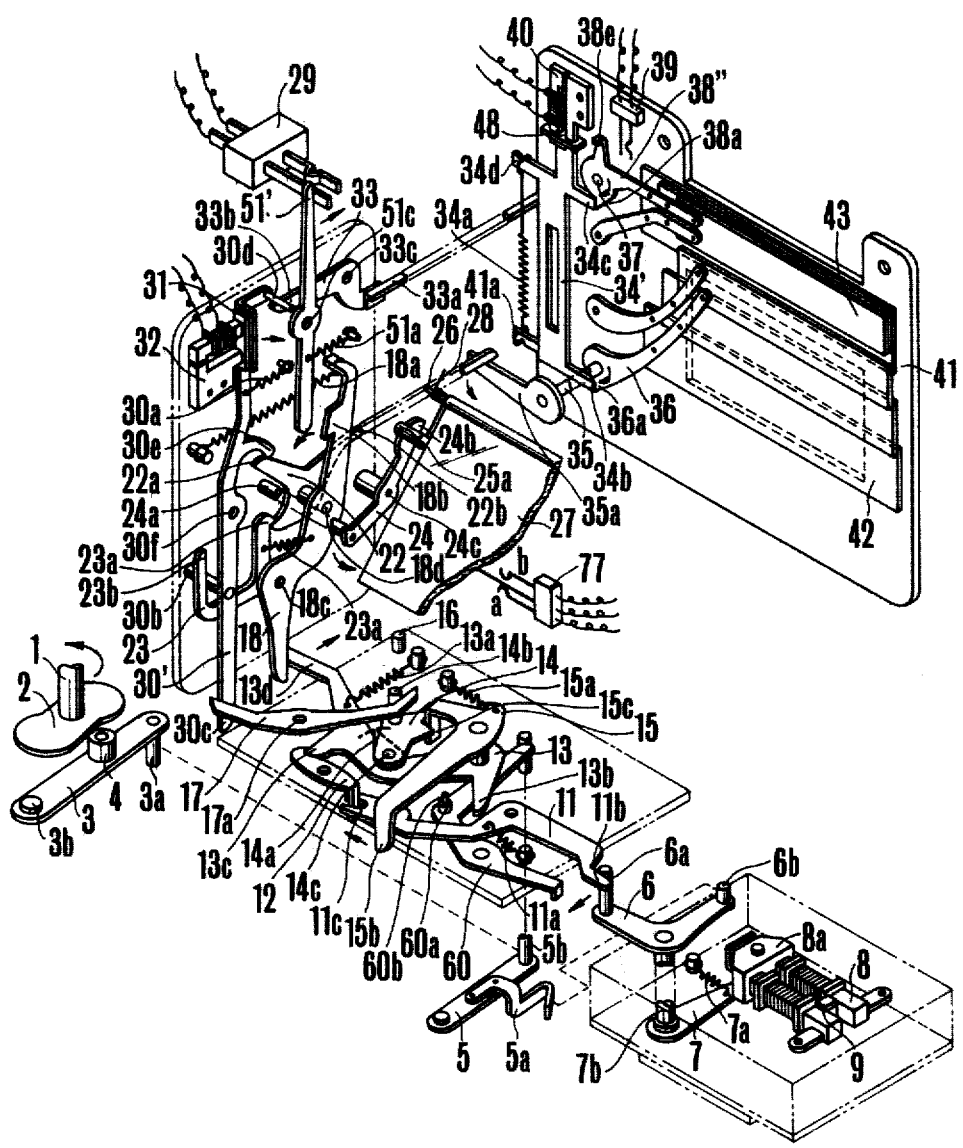
FIG. 4 is an exploded perspective view of a second embodiment of the present invention.

In FIG. 4, 40 is an electromagnet; 48 is a permanent magnet fixedly mounted on the top end of the shutter lock plate 34' and acting as an armature for the electromagnet 40. When the electromagnet 40 is unenergized, the armature 48 attaches the yoke of the electromagnet 40 to sustain the lock plate 34' in the active position. 34f is a spring urging the lock plate for downward movement as viewed in the figure and 34d is an arm for connection of one end of said spring. 30' is a signal lever having a similar function to that of the above-described mirror return signal lever 30, with its top end having an electromagnet 31 fixedly mounted thereon and arranged to attach the yoke of the electromagnet 32 when the electromagnet 32 is not supplied with electrical power. 30a is a spring urging the lever 30' to move away from the electromagnet 32. 51' is a switch control lever rotatable about a shaft 51c and having a lower end to be engaged with the projected portion 18b of the mirror drive lever 18, and an upper end to be engaged with a mirror up completion signal switch 29. 51a is a spring urging the said lever 51' in a counterclockwise direction. 33 is a lever rotatable about a shaft 33c and having one arm 33a engaged with the arm 34d of the lock plate 34' and another arm 33b to be engaged with a pin 30d fixedly mounted on the upper end of the signal lever 30'.

39 is a normally open type switch arranged to be closed by a bent arm 38d of a rear curtain drive lever 38". Except the above cited parts, all the parts are similar to those of the embodiment of FIG. 1, and the same reference characters have been employed to denote the parts having the same functions.

Figure 5:
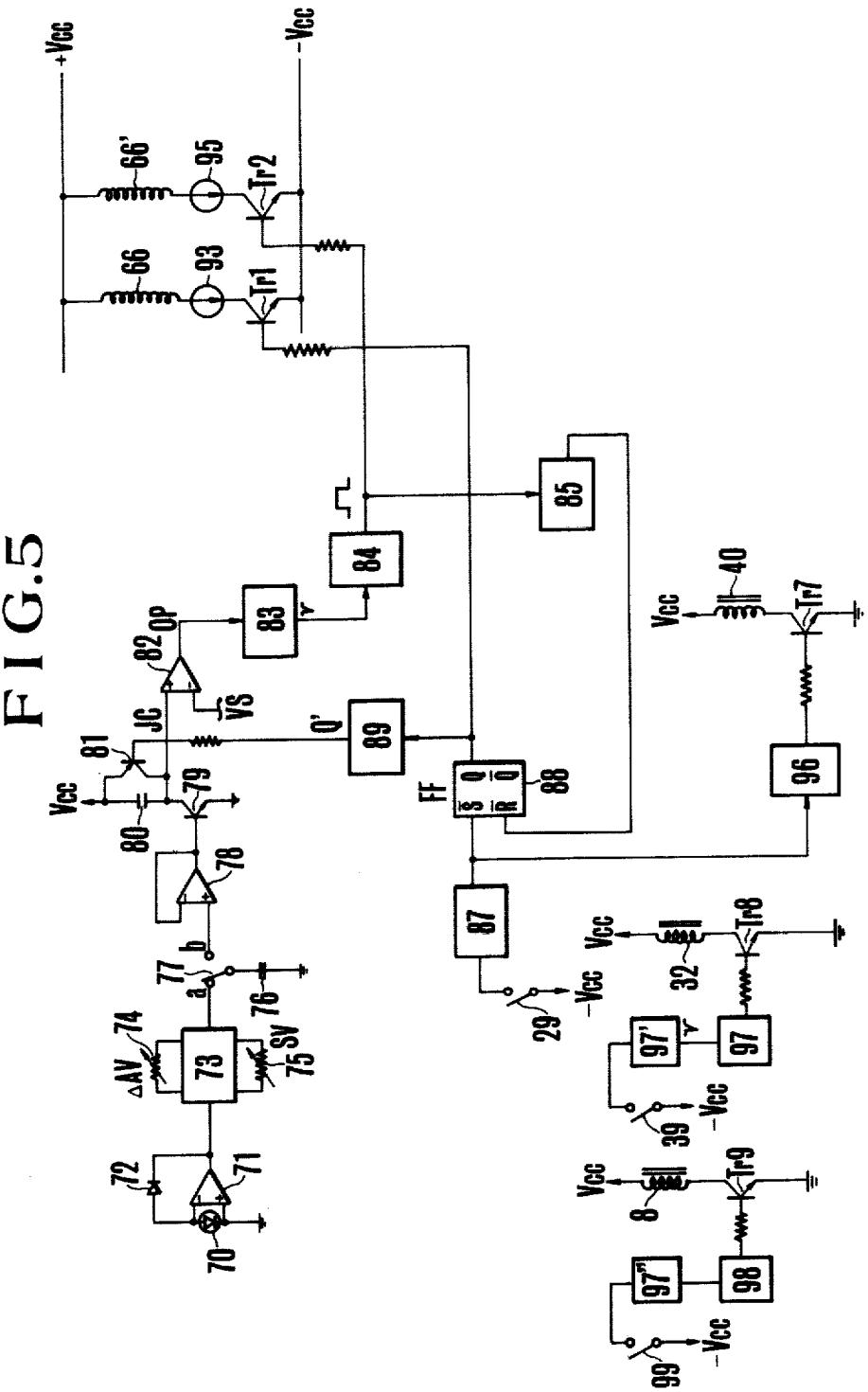
FIG. 5 shows a control circuit in the embodiment of FIG. 4.

FIG. 5 shows a control circuit of the embodiment of FIG. 4, and the same reference characters have been employed to denote the similar parts to those shown in FIG. 3. In the figure, 96 is a timer circuit connected to the output terminal of the above-described differentiation circuit 87 and having an output which is applied to turn on a transistor Tr7 for a predetermined time during which the electromagnet 40 is energized. 39 is the normally open switch to be closed by the rear curtain drive lever 38" as has been mentioned above. When said switch is closed, the differentiation circuit 97' produces a pulse. 97 is a timer circuit triggered by the differentiation pulse from the differentiation circuit 97' to produce a high level output for a predetermined time, Tr8 is a transistor turned on by the output of the timer circuit 97 to energize the electromagnet 32.

Next explanation is given to the operation of the present embodiment. In FIG. 4, the automatic diaphragm and mirror drive mechanism is charged, the shutter curtains engage with the lock plate 34 through the pawl portions 36a, 38a of the drive levers 36 and 38", and said plate 34 locks the front and rear curtains in the start positions under the force of attraction of the permanent magnet 48. From this position, when a release button (not shown) is depressed, the switch 99 is turned on likewise as in the foregoing embodiment to energize the magnet 8, thereby the release lever 11 is turned to release the power storage lever 13 from the latching connection. By the power stored on the drive spring 13a, an automatic diaphragm operation is performed. Along with this, the mirror drive lever 18 is turned to flip up the quick return mirror 27. When the upward movement of the mirror has been completed, the projected portion of the lever 18 engages the lower end of the switch control lever 51', thereby said lever is turned about the shaft 51c against the spring 51a in the clockwise direction.

Then, the switch 29 is turned on, and the differentiation circuit 87 produces a differentiation pulse. Said pulse is applied to the timer circuit 96 and said timer circuit is triggered to produce a high level output for the predetermined time. Responsive to said high level signal, the transistor Tr7 is turned on to energize the electromagnet 40, thereby a magnetic flux of opposite polarity to that of the magnetic flux of the permanent magnet 48 is produced. Therefore, the attractive force of the permanent magnet is temporarily cancelled to allow for downward movement of the lock plate 34 by the force of the spring 34f. This causes the drive arms 36 and 38 to be released from the latching connection. Thus, the shutter curtains are made actuable as are released from the lock, but they are maintained stationary in the start positions by frictional means, or the like as has been mentioned above, until the electromagnetic drive sources are supplied with electrical power.

Meanwhile, the differentiation pulse from the differentiation circuit 87 also is applied to the flip-flop circuit 88 at the set terminal S, thereby said flip-flop circuit 88 is set with production of a high level signal at the output terminal Q thereof. This signal is applied to turn on the transistor Tr1, and a current regulated by the constant current circuit 93 flows through the coil 66 of the electromagnetic drive source for the front curtain. The operation of the front and rear curtains is controlled in a similar manner to that described in connection with the first embodiment.

When the electromagnetic drive source for the rear curtain is energized, the rear curtain runs down. At the terminal end of movement of the rear curtain, the drive arm 38" engages at its lug 38e with the rear curtain signal switch 39 and turns on said switch.

Therefore, the differentiation circuit 97' is actuated to trigger the timer circuit 97 which in turn causes the transistor Tr8 is turned on to energize the electromagnet 32. Then, the permanent magnet 31 fixedly mounted on the top end of the signal lever 30' temporarily losts its attractive force to permit movement away from the electromagnet by the force of the spring 30a. Then, the lever 30' is turned about the shaft 30f in the clockwise direction. Such movement of the lever 30' causes the signal lever 17 to be turned about the shaft 17a in the counterclockwise direction in engagement therewith which in turn causes the cooperation lever 14 to be disengaged from the automatic diaphragm drive lever 15. Then, the lever 15 is returned by the force of the spring 15a to fully open the diaphragm blades. On the other hand, the pin 30b on the lever 30' turns the latching lever 23 about the shaft 18c, thereby the flip-up lever 22 is released from the latching connection. Thus, as has been mentioned above, the mirror 27 is quickly returned by the recovering force of the spring 28, and the resetting lever 35a is turned in the counterclockwise direction by the arm 22b of the flip-up lever 22 to reset the front and rear curtains of the shutter.

At the same time, the pin 30d on the lever 30' pushes the lever 33 at its one arm 33b, thereby said lever 33 is turned about the shaft 33c in the counterclockwise direction, while the opposite arm 33a pushing the lock plate 34 at its arm 34d to move upward against the spring 34f as viewed in the figure until the arms 34b and 34c engages with the pawl portions 36a and 38a of the drive arms. At this time, the lock plate 34 is attached to the yoke of the electromagnet 40 again by the attractive force of the permanent magnet 48.

Figure 6:
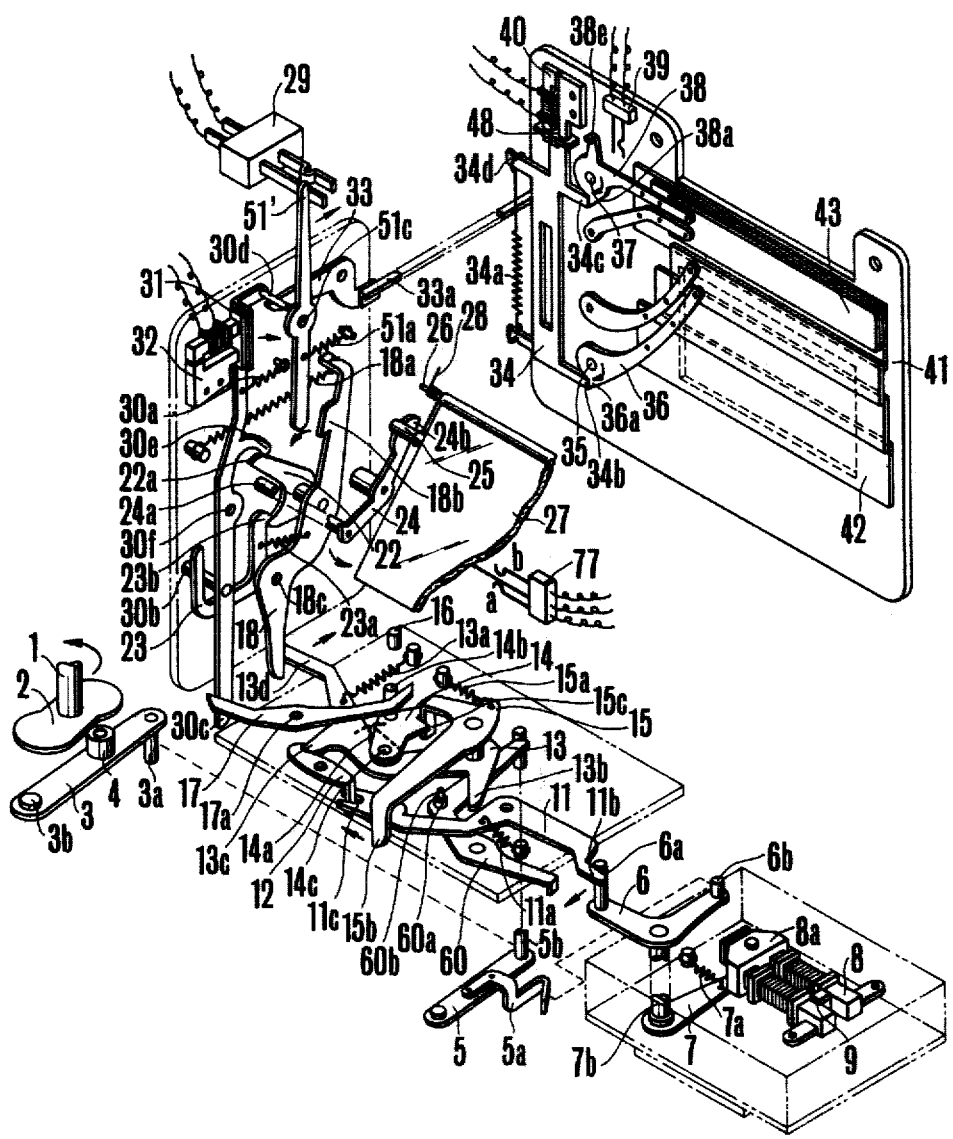
FIG. 6 is an exploded perspective view of a third embodiment of the invention.
Figure 7:
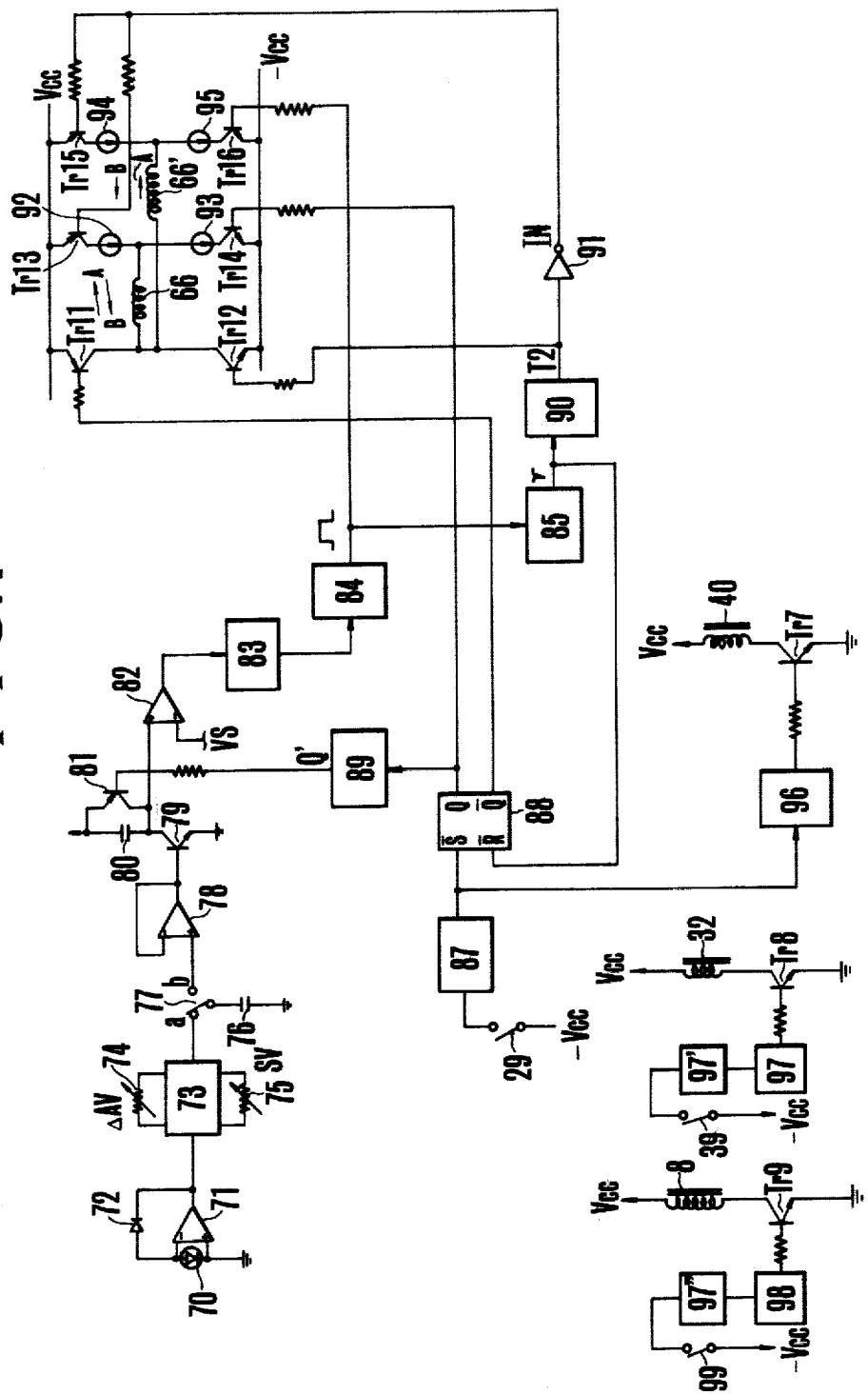
FIG. 7 shows a control circuit in the third embodiment.

FIGS. 6 and 7 show still another embodiment in which the resetting of the shutter is carried out by the use of an electromagnetic drive source.

In FIG. 6, the drive shaft 35 of the front curtain electromagnetic drive source does not have the set lever 35a shown in FIG. 4, and, therefore, the mirror flip-up lever 22' is not provided with the arm 22b for engagement with the set lever 35a. The other points are the same as in FIG. 4.

In FIG. 7, 90 is a timer circuit connected to the output of the differentiation circuit 85 shown in FIG. 5 and responsive to the negative differentiation pulse from the said differentiation circuit 85 to be triggered for production of a high level output which continues for a predetermined time (for example, 20 ms). 91 is an inverter connected to the output of the timer circuit 90. Tr11-Tr16 are transistors constituting a drive circuit for flowing a drive current through the drive coil 66 of the electromagnetic drive source for the front curtain of the shutter and the drive coil 66' of the electromagnetic drive source for the rear curtain of the shutter (not shown). The transistors Tr11, Tr12, Tr13 and Tr14 are connected to form a bridge circuit for the drive coil 66 so that the direction of current flowing through the drive coil 66 is controlled. The other combination of transistors Tr11, Tr12, Tr15 and Tr16 are connected with each other to form a bridge circuit for the drive coil 66' so that the direction of current flowing through the coil 66' is controlled. The above described drive circuit further includes constant current circuits 92-95.

The operation of the embodiment of FIGS. 6 and 7 is as follows. Now assuming that as shown in FIG. 6 the charging has been completed to reset the shutter, then when a release button (not shown) is depressed, likewise as explained in connection with the foregoing embodiment, the switch 99 is turned on to energize the electromagnet 8, and the automatic diaphragm lever 15 and mirror drive lever 18 start to move. At the start of upward movement of the mirror, the switch 77 is changed over from "a" to "b" position where the Tv value is stored on the condenser 76. When the upward movement of the mirror has been completed, the projected portion 18b of the mirror drive lever 18 pushes the switch control lever 51' at the lower end thereof, thereby the said lever is turned in the clockwise direction against the spring 51a and its free end is caused to close the mirror up completion signal switch 29. Then, the differentiation circuit 87 produces a differentiation pulse which is applied to trigger the timer circuit 96 with production of an output signal which continues to take a high level for a predetermined time. Responsive to this high level signal, the transistor Tr7 is turned on to energize the electromagnet 40. Therefore, said electromagnet 40 produces a magnetic flux of opposite polarity to that of the magnetic flux of the permanent magnet, and the lock plate 34 is released from the latching.

At the same time, the differentiation pulse from the differentiation circuit 87 also is applied to the flip-flop 88 at its set terminal S, thereby said flip-flop is set with production of a high level signal at its output terminal Q and of a low level signal at the output terminal Q̄. Therefore, the transistors Tr11 and Tr14 are turned on so that a current flows through the front curtain drive coil 66 in a direction indicated by arrow A, causing the drive shaft 35 to turn in the clockwise direction, and therefore causing the arm 36 to turn in the clockwise direction also. Thus, the shutter starts to open.

Such setting of the flip-flop circuit 88 also causes the delay circuit 89 to produce a high level signal in the delay of a predetermined time, and this signal is applied to turn off the transistor 81. Therefore, the charging of the condenser 80 by the collector current of the transistor 79 starts. Since the base of the said transistor 79 is connected to the output terminal of the amplifier 78, the above identified collector current corresponds to the logarithmically elongated value of the Tv information stored on the condenser 76. Therefore, the condenser 80 is charged at a rate dependent upon the shutter time value determined on the basis of the object brightness. When the voltage on the condenser 80 has reached the reference voltage Vs in the time interval dependent upon the above-identified Tv value, the comparator circuit 82 is inverted to trigger the differentiation circuit 83. Therefore, the differentiation circuit 83 produces a differentiation pulse which is applied to trigger the timer circuit 84, and the timer circuit 84 produces an output signal which continues to take a high level for a predetermined time. This causes the transistor Tr16 to be turned on, so that a current flows through the transistors Tr11 and Tr16 to the rear curtain drive coil 66' in a direction indicated by arrow A, and the drive shaft 37 turns in the clockwise direction so that the rear curtain runs down. It is noted that the duration of the high level output of the timer circuit 84 is set to be somewhat longer than that necessary to complete the full length of running down movement of the rear curtain of the shutter in order to insure that the closing operation of the shutter fulfills itself with high reliability.

After the termination of running down movement of the rear curtain of the shutter, when the output of the timer circuit 84 changes from the high to the low level, the differentiation circuit 85 is triggered to produce a differentiation pulse which is applied to reset the flip-flop circuit 88. The differentiation pulse from the differentiation circuit 85 also triggers the timer circuit 90 and said timer circuit 90 produces a high level signal for a predetermined time, while the inverter 91 produces a low level signal, thereby the transistors Tr11, Tr14 and Tr16 are turned off, and the transistors Tr12, Tr13 and Tr15 are turned on. Therefore a current flows through the drive coils 66 and 66' in a direction indicated by arrow B, so that the electromagnetic drive sources for the front and rear curtains of the shutter are caused to turn in the reversed direction to that when in the above described case, and the shafts 35 and 37 are turned in the counterclockwise direction. Thus, the shutter is reset. It should be noted that the duration of the output of the timer circuit 90 is prescribed to be somewhat longer than time necessary to reset the front and rear curtains of the shutter. It should be further noted that the output current value of the constant current circuit 92 is made larger than that of the constant current circuit 94 so that as the current flowing through the front curtain drive coil 66 is larger than that flowing through the rear curtain drive coil 66', the front curtain moves while pushing the rear curtain through the entire length of resetting movement of the shutter, and there is no possibility of occurrence of accidental opening of the shutter during the resetting operation.

When the resetting operation of the shutter in such a manner has been completed, the timer circuit 90 changes its output to low level at which all the transistors in the drive circuit are turned off to prevent wasteful consumption of electrical energy.

The procedure following the running down movement of the shutter rear curtain is quite similar to that in the second embodiment and resulted in that the rear curtain signal 39 is turned on by the bent portion 38e of the drive arm 38, the automatic diaphragm mechanism and mirror drive mechanism are quickly returned, and the lock plate 34 is returned to the active position.

A further embodiment of the invention will next be described where in order to prevent bound of the shutter curtains, device is provided for allowing a larger current than the drive current for normal movement of the shutter curtains to flow through the drive coils at or near the terminal end of running down movement of the shutter curtains so that the shutter curtains are forcibly pressed against a stopper member. In this embodiment, the moments at which a flowing of the above described bound preventing current is initiated and terminated are estimated and controlled by a timer as measured from the start of current supply for running down movement of the shutter, and the timed relationship and the current values are made adjustable depending upon the individual items of camera.

Figure 8:
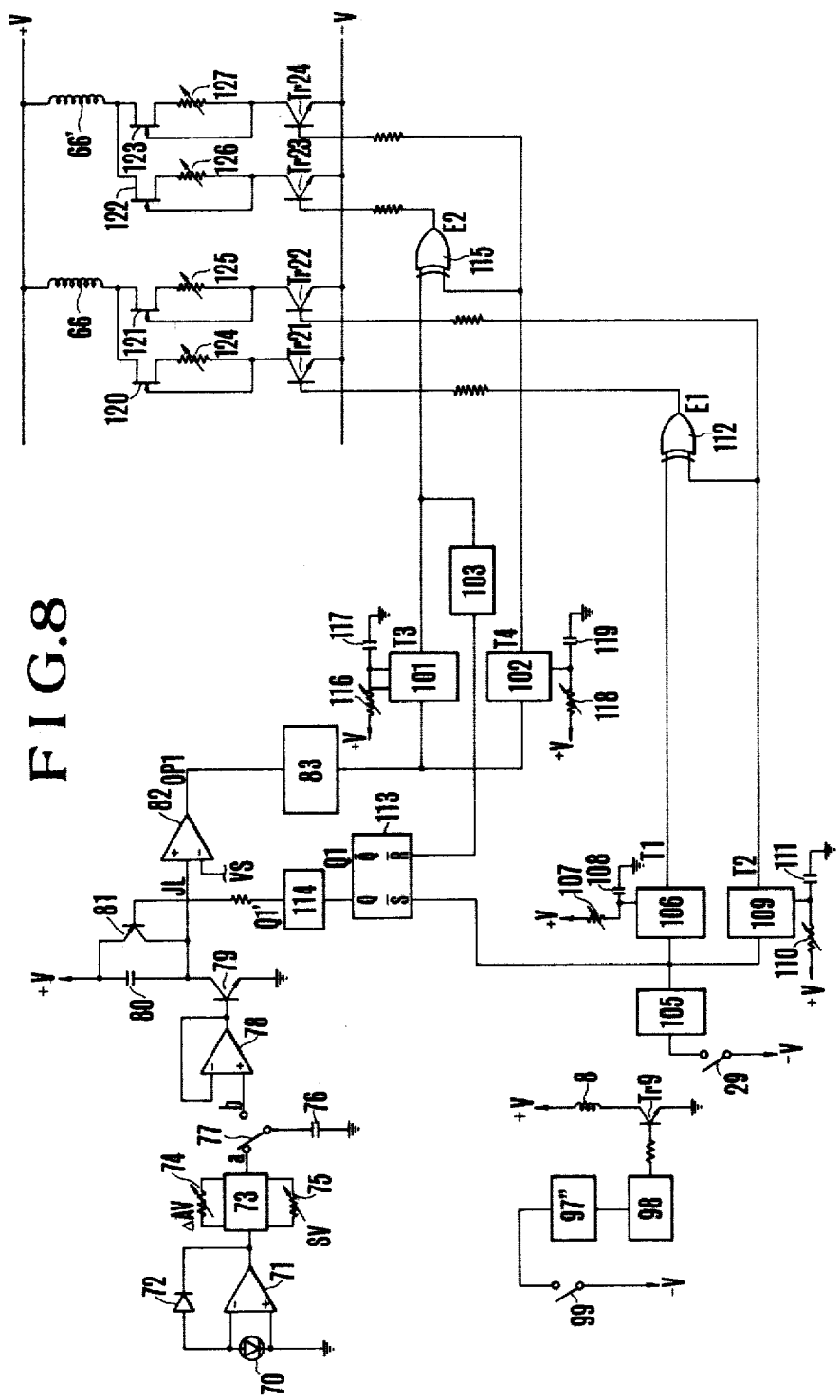
FIG. 8 shows a control circuit in a fourth embodiment.

FIG. 8 shows a control circuit usuable with an electromagnetically operated shutter of the same construction as that shown in FIGS. 1 and 2. In the figure, the same reference characters have been employed to denote the parts having the same functions as in the above described embodiment.

101 and 102 are timer circuits connected to the output of the above described differentiation circuit 83 and to be triggered by the negative differentiation pulse of said differentiation circuit 83 to hold outputs of high level for predetermined times by respective timing circuits of variable resistors and condensers (116, 117) and (118, 119). 115 is an exclusive OR gate having two inputs connected to the respective outputs of the timer circuits 101 and 102. 103 is a differentiation circuit connected to the output of the timer circuit 101. 29 is a switch arranged to be closed when the mirror has completed the upward movement. When said switch is turned on, a differentiation circuit 105 in the next stage produces a negative differentiation pulse. 106 and 109 are timer circuits responsive to the differentiation pulse from the above described differentiation circuit 105 to be triggered to hold outputs of high level for predetermined times by respective timing circuits (107, 108) and (110, 111). 112 is an exclusive OR gate connected to the outputs of the circuits 106 and 109.

66 is a front curtain drive coil, 66' is a rear curtain drive coil, 120-123 are field effect transistors (FET), 124-127 are variable resistors for negative feedback connected between the sources and gates of the above described field effect transistors respectively and constituting constant current circuits together with said FETs, so that their set current values are made adjustable. Tr21-Tr24 are switching transistors with their bases connected respectively to the output of the exclusive OR gate 112, the output of the timer circuit 109, the output of the exclusive OR gate 115 and the output of the timer circuit 102 through resistors.

113 is a RS flip-flop circuit with its set input connected to the output of the differentiation circuit 105, with its reset input connected to the output of the differentiation circuit 103, and with its output Q connected to a delay circuit 114. The output Q' of the delay circuit is connected through a resistor to the base of the above described count start switching transistor 81.

Figure 9:
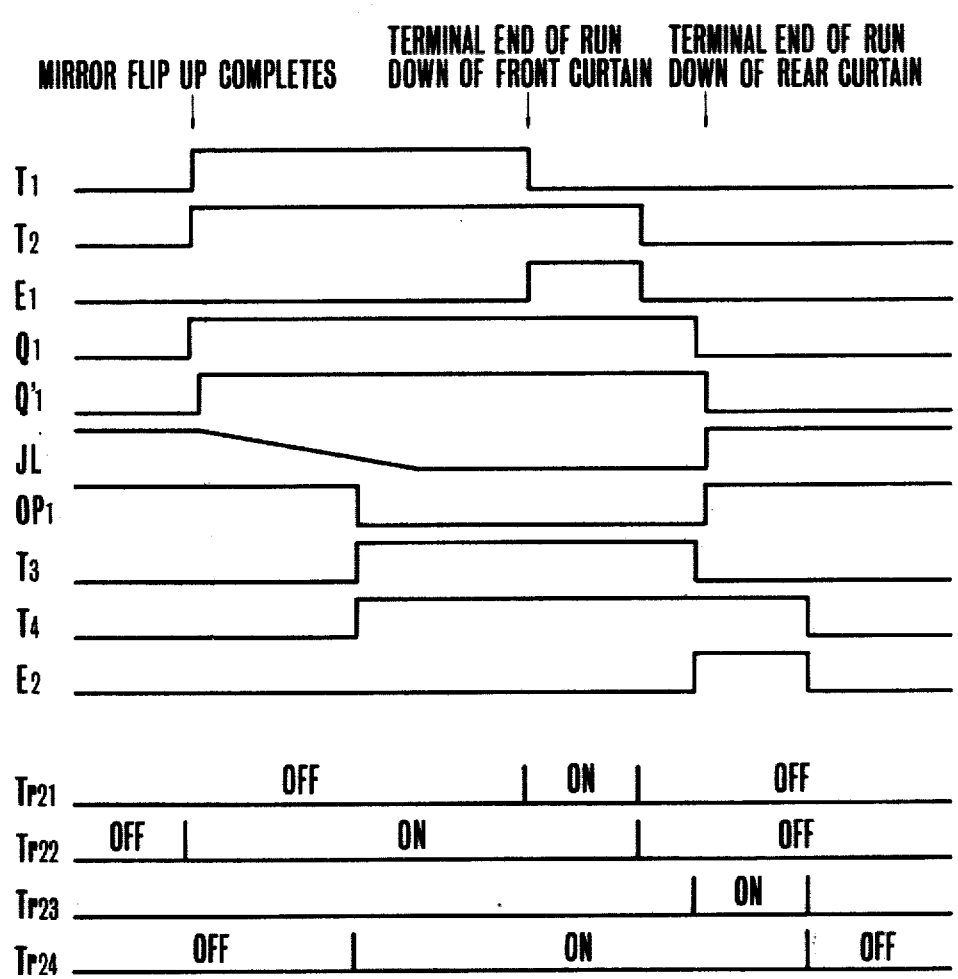
FIG. 9 is a timing chart of the circuit of FIG. 8.

The operation of the circuit of the present embodiment will next be explained with reference to the timing chart of FIG. 9.

The operator will first to push the release button (not shown) thereby as has been explained in connection with the first embodiment, the electromagnet 8 is supplied with electrical power to release the automatic diaphragm mechanism and mirror drive mechanism. Then, the upward movement of the mirror occurs and is followed by the release of the shutter from the lock.

When the upward movement of the quick return mirror has been completed, the switch 29 is turned on, causing the differentiation circuit 105 to produce a negative differentiation pulse. By this pulse is triggered the next stage timer circuits 106 and 109 and their outputs T1 and T2 are changed to high level as shown in FIG. 9. Therefore, the output E1 of the exclusive OR gate 112 changes to low level at which the switching transistor Tr22 is turned on, while the transistor Tr21 remains in OFF state. Then, a constant current regulated by the constant current circuit (121, 125) flows through the front curtain drive coil 66, and the front curtain of the shutter starts to run down. When the front curtain nears the terminal end of movement, the output T1 of the timer circuit changes from the high to the low level, while the output T2 of the timer circuit 109 remains at high level. Therefore, the exclusive OR gate 112 changes its output E1 to high level at which the switching transistor Tr21 is also turned on. Thus, the sum of the currents regulated by the constant current circuits (120, 124) and (121, 125) flows through the front curtain drive coil 66. Although the front curtain after having passed with the top end of its blade 42-3 (FIG. 2) by the aperture 41a dashes against a stopper member (not shown), it hardly bounds therefrom as it is pressed against said stopper member by a stronger force than when running so that there is no possibility that the top end of the blade reaches the area of opening of the aperture 41a. The repulsive force due to the impact rapidly damps and the front curtain stops.

As the switch 29 is closed, when the negative differentiation pulse is produced from the differentiation circuit 105, the RS flip-flop circuit 113 is set, and its output Q1 is inverted to high level. In the delay of some time from that, the output Q'1 of the delay circuit 114 is also inverted to high level at which the count start switching transistor 81 is turned off. Then the timing condenser 80 is charged with current of the transistor 79 for time elongation. When the voltage on the condenser 80 has reached a predetermined level, the output of the OP amplifier 82 is changed from the high level to the low level, and the differentiation circuit 83 in the next stage produces a negative differentiation pulse which is applied to trigger the timer circuits 101 and 102 with change of their outputs T3 and T4 to high level. Since at this time, the output E2 of the exclusive OR gate 115 is of low level, the switching transistor Tr24 is turned on, while the switching transistor Tr23 remains OFF. Thus, a constant current regulated by the constant current circuit (123, 127) flows through the rear curtain drive coil 66', and the rear curtain starts to run down.

When the rear curtain of the shutter nears the terminal end of running down movement, the timer 101 changes its output T3 from the high level to the low level. Since the output T4 of the timer circuit 102 remains of the high level, the output E2 of the exclusive OR gate 115 is inverted to the high level, and the switching transistor Tr24 is also turned on. Thus, the sum of the constant currents regulated by the constant current circuits (122, 126) and (123, 127) flows through the rear curtain drive coil 66', thus applying a larger force than that by which the rear curtain is driven to run down to the rear curtain at the time when it hits the stopper member (not shown) or the front curtain. Therefore the rear curtain gets stopped without the occurrence of a bound likewise the front curtain, and there is no possibility of occurrence of a re-exposure at any portion of the area of the picture frame.

When the above described timer circuit 101 changes its output T3 from the high level to the low level, the differentiation circuit 103 produces a negative differentiation pulse which is applied to the RS flip-flop circuit 113 at the reset terminal thereof. Then, its output Q1 is inverted from the high level to the low level. In the delay of some time from that, the delay circuit 114 also changes its output Q'1 to the low level at which the count start switching transistor 81 is turned on to discharge the timing condenser 80, and the output OP1 of the OP amplifier 82 changes to the high level.

After the shutter has been closed, the automatic diaphragm mechanism, quick return mirror and shutter resetting mechanisms operate in a same manner as that described in connection with the first embodiment.

In this embodiment, bound of the shutter curtains is prevented by the electromagnetic drive sources as the large current is allowed to flow through each of the drive coils at the terminal end of movement of the front and rear curtains of the shutter. The period and timing of supply of this large current (that is, the period and timing for which the output E2 or E1 the exclusive OR gate 115 or 112 takes high level) are set by adjusting the time constant of the timer circuits 101, 102 or 106, 109 by the variable resistors 116, 118 or 107, 110.

It is ideal that the time at which the output E2 or E1 of the exclusive OR gate 115 or 112 is inverted to the high level be adjusted at or just before the time point at which the running down movement of the front curtain or rear curtain of the shutter is completed and that the period during which the output E2 or E1 holds the high level be adjusted to the duration of bound of the front curtain or rear curtain.

It should be noted that the value of current flowing the coil to prevent the bound may be adjusted by the variable resistors 124, 125 or 126, 127 of the constant current circuits, so that the current of value meeting the characteristics of bound of each individual shutter is allowed to flow.

Figure 10:
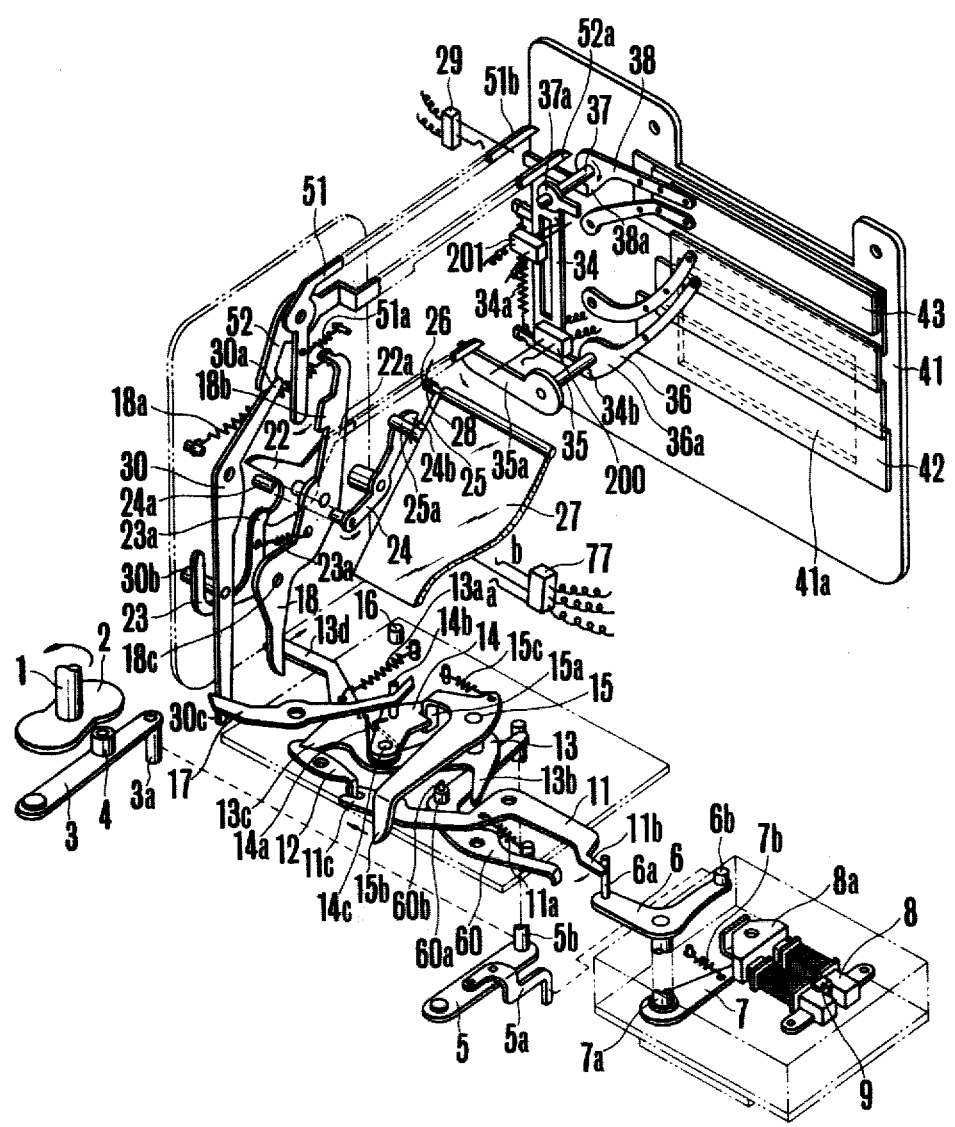
FIG. 10 is an exploded perspective view of a fifth embodiment of the present invention.

FIG. 10 and those that follow show a further embodiment in which the timing of supply of an additional current to the shutter curtain drive coil is controlled in accordance with the position of the front curtain and rear curtain detected by the use of a switch as they run down.

Figure 11:
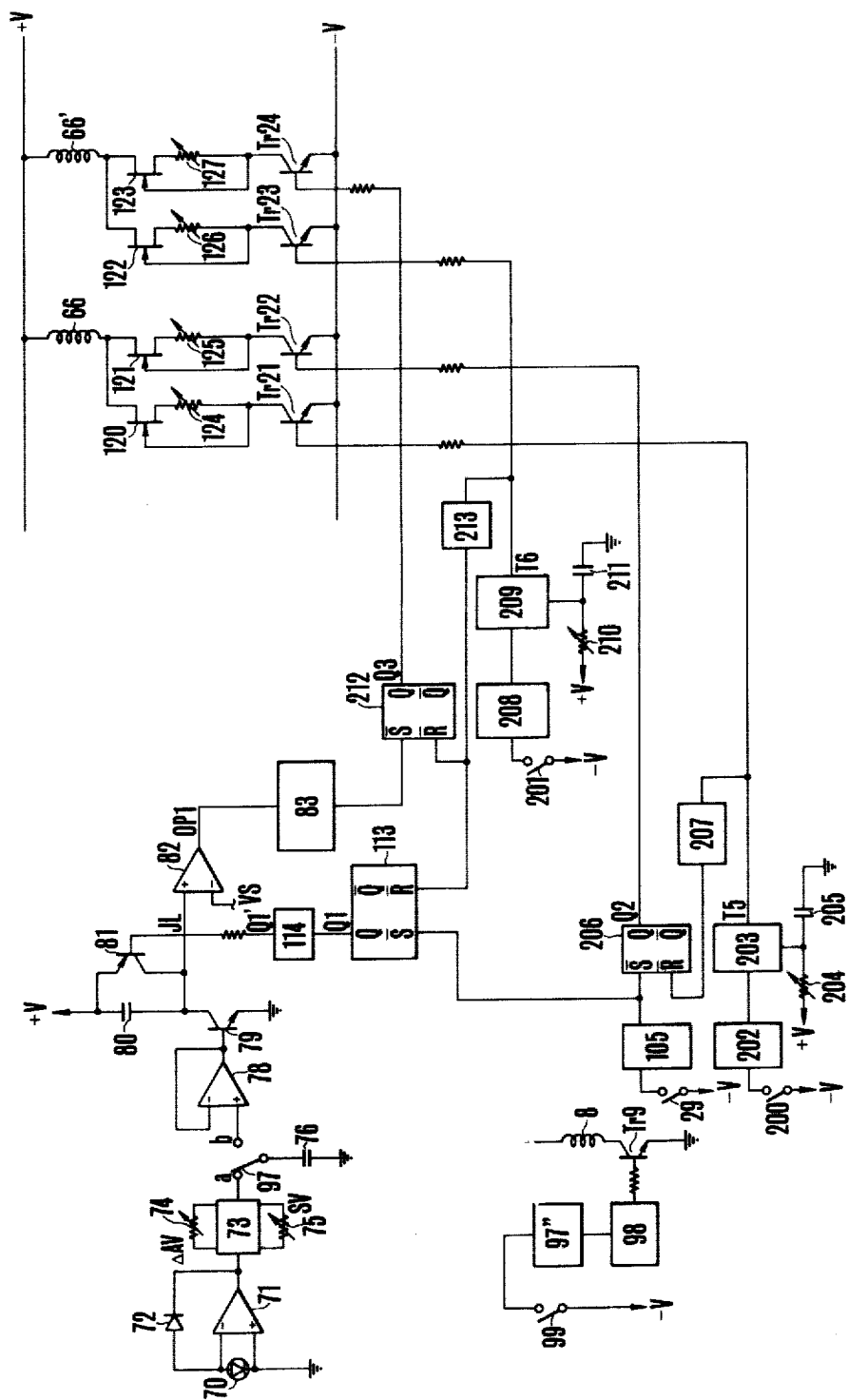
FIG. 11 is an electrical circuit diagram of the embodiment of FIG. 10.
Figure 12:
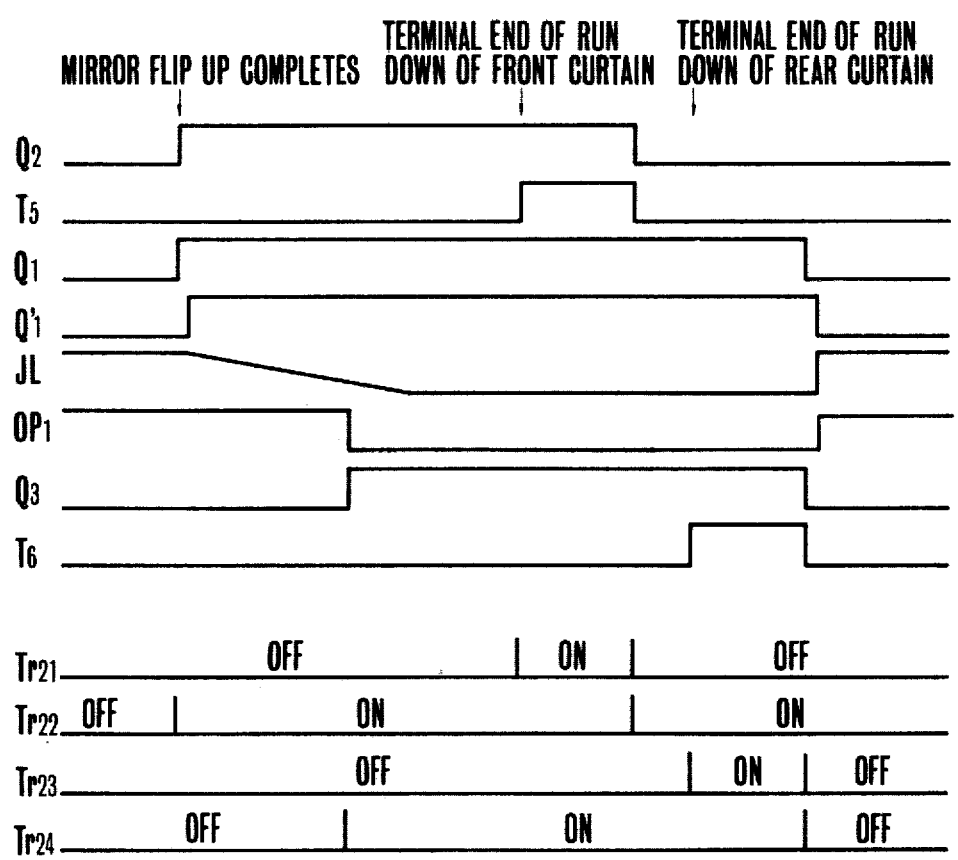
FIG. 12 is a timing chart of the circuit of FIG. 11.

FIG. 10 shows the structure of an electromagnetically operated shutter in this embodiment. FIG. 11 is a control circuit of the present embodiment, and FIG. 12 shows a timing chart.

In FIG. 10, 200 is a front curtain run down detecting switch having two contacts laying in the path of rotation of the above described shutter set lever 35a so that they are closed by the lever 35a just before the running down movement of the front curtain of the shutter is completed.

201 is a rear curtain run down detecting switch having two contacts lying in the path of rotation of a lever 37a which is fixedly mounted on the rear curtain drive shaft 37, so that they are closed as pushed by the lever 37a just before the running down movement of the rear curtain is completed. The other feature is the same as in FIG. 1.

In FIG. 11, the same reference characters have been employed to denote the similar parts to those shown in FIG. 8. 200 is the front curtain run down detecting switch, and 202 is a differentiation circuit responsive to the closure of the switch 200 for producing a negative differentiation pulse. 203 is a timer circuit responsive to the pulse output of the differentiation circuit 202 to be triggered, and its output T5 takes high level for a predetermined time dependent upon a variable resistor 204 and a condenser 205. 206 is a RS flip-flop circuit with its set input connected to the output of the differentiation circuit 105 and with its reset input connected to the output of a differentiation circuit 207 which is connected to the output T5 of the timer circuit 203. 201 is the rear curtain run down detecting switch, and 208 is a differentiation circuit responsive to the closure of said switch 201 for producing a negative differentiation pulse. 209 is a timer circuit responsive to the pulse output of said differentiation circuit 208 to be triggered, and its output T6 takes high level for a predetermined time dependent upon a variable resistor 210 and a condenser 211. 212 is a RS flip-flop circuit with its set input connected to the output of the differentiation circuit 83 and with its reset input connected to the output of a differentiation circuit 213 which is connected to the output T6 of the timer circuit 209.

Bases of switching transistors Tr21-Tr24 are connected through respective resistors to the output T5 of the timer circuit 203, the Q output Q2 of the RS flip-flop 206, the output T6 of the timer circuit 209 and the Q output Q3 of the RS flip-flop 212 respectively.

The operation of the circuit described above will be explained by reference to the timing chart of FIG. 12.

Likewise in the above described embodiment, when the switch 29 is closed in response to the completion of upward movement of the quick return mirror, the differentiation circuit 105 produces the negative differentiation pulse which is applied to set the RS flip-flop circuit 206, and its Q output Q2 is inverted to high level to turn on the switching transistor Tr22. Then the front shutter curtain drive coil 66 is supplied with a constant current determined by the constant current circuits (121, 125), and the drive shaft 35 and drive arm 36 turn in the clockwise direction, thereby the front curtain 42 starts to run down. After the top end of the front curtain has moved past the lower edge of the exposure aperture 41a, when it comes to a point of position just before the collision with the stopper member (not shown), the reset lever 35a fixedly mounted on the drive shaft 35 pushes the contact of the front curtain run down detecting switch 200, thereby the said switch 200 is turned on. This causes the differentiation circuit 202 to produce a negative differentiation pulse which is applied to trigger the timer circuit 203. Its output T5 is inverted to and maintained at high level for a certain time dependent upon the variable resistor 204 and the condenser 205. During this time the switching transistor Tr21 also is turned on so that the front curtain drive coil 66 is supplied in addition to the current from the constant current circuits (120, 124) with a current from the constant current circuits (121, 125). Likewise as in the above described case, therefore, the shutter curtain is suppressed so as to prevent bound as a stronger force than when running down is applied thereto. After the elapse of a certain time, the timer circuit 203 changes its output T5 to low level at which the differentiation circuit 207 produces a negative differentiation pulse which is applied to reset the RS flip-flop circuit 206 with change of its output Q2 to low level also. Thus, the switching transistors Tr21 and Tr22 are both turned off to deenergize the coil 66.

On the other hand, as the upward movement of the quick return mirror has been completed, and the switch 29 has been closed, when the differentiation circuit 105 produces the negative differentiation pulse, the RS flip-flop circuit 113 is set with inversion of its Q output Q1 to high level. In the delay of some time from that, the output Q'1 of the delay circuit 114 also changes to high level, and the switching transistor 81 for count start is turned off to start charging of the timing condenser 80. When the voltage JL on the condenser 80 has reached a predetermined value, the output OP1 of the OP amplifier 82 is inverted to low level, causing the differentiation circuit 83 to produce a negative differentiation pulse which is applied to set the RS flip-flop 212 with change of its Q output Q3 to high level. Therefore, the switching transistor Tr24 is turned on to supply the rear shutter curtain drive coil 66' with a constant current regulated by the constant current circuits (123, 127). Then, the drive shaft 37 and drive arm 38 turn in the clockwise direction, thus the rear curtain 43 starts to run down.

When the rear curtain 43 has reached the terminal end of running down movement, the lever 37a fixedly mounted on the drive shaft 37 pushes the contact of the above described rear curtain run down detecting switch 201, thereby said switch is closed. This causes the differentiation circuit 208 to produce a negative differentiation pulse which is applied to trigger the timer circuit 209. Then, the output T6 of the timer circuit 209 is inverted to and maintained at high level for a certain time dependent upon the variable resistor 210 and condenser 211, and the switching transistor Tr23 also is turned on.

During this time, therefore, the rear curtain drive coil 66' is supplied with a constant current of the sum of the current regulated by the constant current circuits (123, 127) and the current regulated by the constant current circuits (122, 126), thus preventing bound of the rear curtain of the shutter.

As the thus determined time has passed, when the output T6 of the timer circuit 209 is inverted to low level, the differentiation circuit 213 produces a negative differentiation pulse which is applied to reset the RS flip-flop circuit 212 with inversion of its Q output Q3 to low level. Thus, the switching transistors Tr23 and Tr24 both are turned off to stop the energization of the coil 66', and the RS flip-flop 113 is reset by the differentiation pulse from the differentiation circuit 213.

In the present embodiment, the period for which the switching transistors Tr21, Tr22, Tr23, Tr24 are rendered conducting to prevent bound (or the period for which the output T5 of the timer circuit 203, or the output T6 of the timer circuit 209 takes high level) is set to a proper value depending upon the time of bound of each individual shutter by adjusting the variable resistor 204 or 210.

Also the value of current flowing through the drive coils 66, 66' for the purpose of preventing bound is made suitable to the bound strength of each individual shutter by adjusting the variable resistors 124–127 of the constant current circuits.

What is claimed is:

1. A camera having an electromagnetically driven shutter comprising:
   (a) a front shutter curtain and a rear shutter curtain;
   (b) electromagnetic drive source means responsive to supply of current for producing electromagnetic forces by which the front shutter curtain and the rear shutter curtain are individually driven to run down;
   (c) means coupled to an electrical power source for supplying current to said electromagnetic drive source;
   (d) shutter lock means arranged to engage said shutter front and rear curtains when they lie in positions ready to run down for rendering both shutter curtains inoperative; and
   (e) lock release means for releasing said lock means prior to the supply of current to said electromagnetic drive source,
   said shutter front and rear curtains being arranged to begin to travel when the electromagnetic drive source means receive the current supply from the control circuit after the release of the shutter lock means.

2. A camera having an electromagnetically driven shutter comprising:
   (a) a front shutter curtain and a rear shutter curtain;
   (b) electromagnetic drive source means responsive to supply of current for producing electromagnetic forces by which the respective front shutter curtain and the rear shutter curtain run down;
   (c) means coupled to an electrical power source for supplying current to said electromagnetic drive source;
   (d) a shutter lock member displaceable between a first position engaging said front and rear shutter curtains and a second position out of engagement therewith for locking said front and said rear shutter curtains so as to be inoperative when the lock member is in the first position;
   (e) a permanent magnet for holding said lock means in said first position; and
   (f) electromagnetic means responsive to operational release of the camera for drawing current prior to the supply of current to the electromagnetic drive means of the front shutter curtain and for releasing said lock member from the holding power of said permanent magnet.

3. A single lens reflex camera having an electromagnetically driven focal plane shutter and a quick return mirror, comprising:
   (a) a front shutter curtain and a rear shutter curtain;
   (b) electromagnetic drive source means responsive to supply of current for producing electromagnetic forces by which said front and said rear shutter curtains are driven so they run down;
   (c) means coupled to an electrical power source for supplying current to said electromagnetic drive sources;
   (d) mirror drive means for moving the quick return mirror upward and returning the mirror;
   (e) power storing means for putting said quick return mirror drive means into operation;
   (f) release means for starting movement of said quick return mirror drive means;

(g) shutter lock means for locking said front and rear shutter curtains in positions ready for a run down operation; and (h) release means responsive to completion of upward movement of said quick return mirror to release the front and rear curtains of the shutter from the locked condition with said lock means in response to actuation of the mirror drive means;

(i) switch means within said control circuit arranged to have the current supply to the electromagnetic drive sources begin in response to the release of the shutter front and rear curtains from their locked state by the release means.

4. A single lens reflex camera having an electromagnetically driven focal plane shutter and a quick return mirror, comprising;

(a) a front shutter curtain and a rear shutter curtain;

(b) electromagnetic drive source means responsive to supply of current for producing electromagnetic forces by which said front and said rear shutter curtains are driven so they run down;

(c) mirror drive means for moving said quick return mirror upward and returning said quick return mirror;

(d) power storing means for putting said mirror drive mechanism into operation;

(e) release means for starting movement of said mirror drive mechanism;

(f) shutter locking means for locking said front and said rear shutter curtains in positions ready to run down;

(g) lock release means responsive to completion of upward movement of the mirror by said mirror drive means to release the front and the rear shutter curtains from the locking connection by said lock means;

(i) actuating means for actuating the electromagnetic drive source means for causing the shutter to run in response to the upward movement of the quick return mirror;

(j) quick return means for causing the mirror drive means to have the mirror quickly returned upon completion of the travel of the shutter; and (k) reset means arranged in association with the mirror drive mechanism to reset the shutter in response to the quick return of the mirror.

5. A camera according to claim 4, wherein said electromagnetic drive source for the front curtain has a member arranged to engage with said mirror drive means, and wherein said member turns in cooperation with the mirror quick return movement of the mirror drive means to return the shutter curtains to said start positions through said connection means.

6. A camera according to claim 4, further including means responsive to the rear curtain completely running down for producing a signal, and means receptive to said signal for producing a signal for controlling the return of the mirror so that said mirror drive means returns the mirror in response to said mirror return control signal.

7. A camera according to claim 3, further including means responsive to detection of the completion of upward movement of the quick return mirror for producing a signal and means responsive to said signal for releasing said lock member from the locking condition.

8. A camera according to claim 6, further including means responsive to said mirror return control signal for returning said shutter lock means to the position ready for running down of the shutter curtain.

9. A camera according to claim 1, further including a control circuit for supplying said electromagnetic drive source with drive current from the electrical power source means so that said circuit permits the drive currents to flow in the same direction for a predetermined time after the shutter curtain has run down.

10. A camera according to claim 9, wherein said control circuit has means for increasing the drive current for a given time after the shutter curtain has run down.

11. A camera according to claim 10, wherein said drive current increasing means has current adjusting means for adjusting the increase in current.

12. A camera according to claim 10, wherein said current increasing means includes a timer circuit.

13. A camera according to claim 10, wherein said current increasing means includes a switch cooperative with the shutter curtain.

* * * * *